US008550786B2

(12) United States Patent
Janiuk

(10) Patent No.: US 8,550,786 B2
(45) Date of Patent: Oct. 8, 2013

(54) VERTICAL AXIS WIND TURBINE WITH SELF-STARTING CAPABILITIES

(76) Inventor: Peter Janiuk, Etobicoke (CA)

( * ) Notice: Subject to any disclaimer, the term of this patent is extended or adjusted under 35 U.S.C. 154(b) by 970 days.

(21) Appl. No.: 12/636,334

(22) Filed: Dec. 11, 2009

(65) Prior Publication Data

US 2011/0142659 A1    Jun. 16, 2011

(51) Int. Cl.
*F03B 3/12* (2006.01)
*F03D 7/06* (2006.01)

(52) U.S. Cl.
USPC ........................................... 416/226; 415/4.2

(58) Field of Classification Search
USPC ............ 416/226, 223 R, 229 R, 235, 243, 88, 416/242; 415/4.2, 4.3, 159, 160, 163, 230, 415/241, 219 R
See application file for complete search history.

(56) References Cited

U.S. PATENT DOCUMENTS

| | | | |
|---|---|---|---|
| 1,467,699 A | 9/1923 | Vinding et al. | |
| 2,014,032 A | 9/1935 | Sharpe et al. | |
| 3,706,430 A * | 12/1972 | Kline et al. | 244/35 R |
| 3,995,170 A | 11/1976 | Graybill | |
| 4,048,947 A | 9/1977 | Sicard | |
| 4,115,027 A | 9/1978 | Thomas | |
| 4,255,085 A | 3/1981 | Evans | |
| 4,264,279 A | 4/1981 | Dereng | |
| 4,285,636 A | 8/1981 | Kato et al. | |
| 4,434,957 A * | 3/1984 | Moritz | 244/35 R |
| 4,550,259 A | 10/1985 | Bertels | |
| 5,151,014 A * | 9/1992 | Greenwald et al. | 416/237 |
| 5,324,164 A * | 6/1994 | Doering et al. | 415/150 |
| 5,336,933 A | 8/1994 | Ernster | |
| 5,463,257 A | 10/1995 | Yea | |
| 5,588,804 A * | 12/1996 | Neely et al. | 416/223 R |
| 6,870,280 B2 | 3/2005 | Pechler | |
| 7,084,523 B2 | 8/2006 | Noguchi | |
| 2007/0224029 A1* | 9/2007 | Yokoi | 415/4.2 |
| 2007/0297903 A1* | 12/2007 | Morris | 416/132 A |
| 2008/0256795 A1 | 10/2008 | Edwards | |
| 2009/0167030 A1* | 7/2009 | Watkins | 290/55 |
| 2011/0018280 A1* | 1/2011 | Mahaffy et al. | 290/55 |

FOREIGN PATENT DOCUMENTS

WO    2009072116 A2    6/2009

OTHER PUBLICATIONS

International Search Report and Written Opinion for International Patent Application No. PCT/CA2010/001777, dated Feb. 4, 2011.

* cited by examiner

*Primary Examiner* — Nathaniel Wiehe
*Assistant Examiner* — Aaron Jagoda
(74) *Attorney, Agent, or Firm* — Bereskin & Parr LLP/S.E.N.C.R.L., s.r.l.

(57) ABSTRACT

A vertical axis wind turbine and vertical axis wind turbine assembly comprising a rotary body and a plurality of blades. A cross section through each blade of the plurality of blades transverse to the rotary axis comprises an inner camber line, an outer camber line, and a chord line. The outer camber line comprises a first portion, a transition portion and a second portion. The second portion is longer, in the lengthwise direction, than a combined length of the first portion and the transition portion. The average second portion thickness is less than half an average first portion thickness. A magnitude of an average rate of change in a transition portion thickness is at least twice a magnitude of an average rate of change in a first portion thickness, and a magnitude of an average rate of change in a second portion thickness.

9 Claims, 10 Drawing Sheets

VERTICAL AXIS WIND TURBINE WITH SELF-STARTING CAPABILITIES

FIELD

The present invention relates to a power system. More particularly, the present invention relates to a vertical axis wind power system.

BACKGROUND OF THE INVENTION

Wind turbines that can be used with an electrical generator to generate electricity include horizontal axis wind turbines (HAWT) and vertical axis wind turbines (VAWT). Both types of wind turbine are used to transform kinetic energy from the wind into mechanical energy.

SUMMARY

One embodiment of a first aspect of the present invention is a vertical axis wind turbine comprising: a rotary body operable to rotate about a rotary axis; and a plurality of blades coupled to the rotary body to rotate the rotary body about the rotary axis, each blade of the plurality of blades comprising a leading edge and a trailing edge. A cross section through each blade of the plurality of blades transverse to the rotary axis comprises a inner camber line facing the rotary body; a outer camber line facing away from the rotary body; a first convergence of the inner camber line and the outer camber line located at a first longitudinal extremity of the cross section where the leading edge intersects the cross section; and a second convergence of the inner camber line and the outer camber line located at a second longitudinal extremity of the cross section where the trailing edge intersects the cross section, that second longitudinal extremity being longitudinally opposed to the first longitudinal extremity; a chord line extending directly from the first convergence to the second convergence in a lengthwise direction; and a widthwise axis substantially orthogonal to the lengthwise direction and extending, in a widthwise direction, from the inner camber line at an inner intermediate point to the outer camber line at an outer intermediate point.

The inner camber line defines an inner camber path direction from the first convergence to the second convergence, and the outer camber line defines an outer camber path direction from the first convergence to the second convergence.

At any point along the outer camber line the outer camber path direction is tangential to the outer camber line and comprises a first component extending in the lengthwise direction and a second component extending in the widthwise direction. At any point along the inner camber line, the inner camber path direction is tangential to the inner camber line and comprises a first component extending in the lengthwise direction and a second component extending in the widthwise direction. At any point along the outer camber line the first component of the outer camber path direction is positive.

The outer camber line comprises a first portion extending from the first convergence to the outer intermediate point, a transition portion extending from the outer intermediate point to a transition point and a second portion extending from the transition point to the second convergence. The second portion is longer, in the lengthwise direction, than a combined length of the first portion and the transition portion in the lengthwise direction; an average second portion thickness is less than half an average first portion thickness, the average first portion thickness, the average second portion thickness and an average transition portion thickness being measured from the outer camber line to the inner camber line in the widthwise direction; and, a magnitude of an average rate of change in a transition portion thickness is at least twice a magnitude of an average rate of change in a first portion thickness, and a magnitude of an average rate of change in a second portion thickness.

In one variant of blade that can be used with the first aspect of the present invention, the transition portion of the outer camber line intersects the chord line.

In another variant of blade, a transition portion thickness at the outer intermediate point is greater than a thickness of any of the first portion, second portion, and transition portion, at any point other than the outer intermediate point along the outer camber line.

Another variant of blade comprises a transition portion thickness at the outer intermediate point that is more than twice a transition portion thickness at the transition point.

In a further variant of blade, the first portion is longer in the lengthwise direction than a length of the transition portion in the lengthwise direction.

In another variant of blade, a length of the second portion in the lengthwise direction is more than thrice the length of the transition portion in the lengthwise direction.

In yet another variant, an overall length of the blade is more than four times a length of the transition portion in the lengthwise direction, the overall length of the blade being measured between the first convergence and the second convergence of the inner camber line and the outer camber line in the lengthwise direction.

A further variant of blade comprises an overall length of the blade, in the lengthwise direction, more than five times a transition portion thickness at the outer intermediate point.

In an embodiment of the first aspect of the present invention, each blade of the plurality of blades comprises a foam core with a carbon reinforced ribbing and spar, that core being covered with carbon fiber.

Another embodiment of the first aspect of the present invention, further comprises a generator in mechanical communication with the rotary body.

Yet another embodiment of the first aspect of the present invention is a vertical axis wind turbine comprising a rotary body operable to rotate about a rotary axis and a plurality of blades coupled to the rotary body to rotate the rotary body. Each blade of the plurality of blades comprises an airfoil-shaped body having a substantially symmetrical portion, and an asymmetrical portion having a outer camber bordering a cut-away portion. A cross-section through each blade of the plurality of blades transverse to the rotary axis comprises a first endpoint located at a first longitudinal extremity of the cross-section, a second endpoint located at a second longitudinal extremity of the cross-section, a chord line extending from the first longitudinal extremity to the second longitudinal extremity, a widthwise direction substantially perpendicular to the chord line, an inner camber line, an outer camber line, a cut-away length, and a cut-away depth.

In this embodiment, throughout the substantially symmetrical portion of the cross-section of each blade, an average magnitude of a widthwise distance between the outer camber line and the chord line is between 90 percent and 110 percent of an average magnitude of a widthwise distance between the inner camber line and the chord line. A length of the substantially symmetrical portion comprises more than one tenth of the length of the chord line, the length of the substantially symmetrical portion being measured parallel to the chord line. The outer camber surface of each blade of the plurality of blades faces away from the rotary body. Throughout the asymmetrical portion of the cross-section of each blade, an average of a first displacement from the chord line to the inner camber line is more than three times an average of a second displacement from the chord line to the outer camber line, the first displacement being positive toward the rotary axis, and the second displacement being positive away from the rotary axis. At any point along the chord line, there is one and only one corresponding point along the inner camber line in the widthwise direction, and one and only one corresponding point along the outer camber line in the widthwise direction. The cut-away length comprises more than seventy percent of the overall length of the cross section. The cut-away depth comprises more than sixty percent of the maximum thickness of the airfoil-shaped body and less than eighty percent of the maximum thickness of the airfoil-shaped body.

An embodiment of a second aspect of the present invention is directed at an assembly comprising the individual components of the first aspect of the present invention. In addition, each blade of the plurality of blades comprises couplers for coupling the blade to the rotary body such that the inner camber line faces the rotary body, and the outer camber line faces away from the rotary body.

In another embodiment of the second aspect of the present invention, the couplers impede coupling of each blade of the plurality of blades to the rotary body such that the outer camber line faces the rotary body, and the inner camber line faces away from the rotary body.

The same blade variants described for the first aspect may be used with the second aspect of the present invention, and the embodiments of the first aspect are equally applicable to the second aspect.

DRAWINGS

For a better understanding of the system and vertical axis wind turbine described herein, and to show more clearly how they may be carried into effect, reference will be made, by way of example, to the accompanying drawings in which.

DESCRIPTION OF VARIOUS EMBODIMENTS

Figure 1:
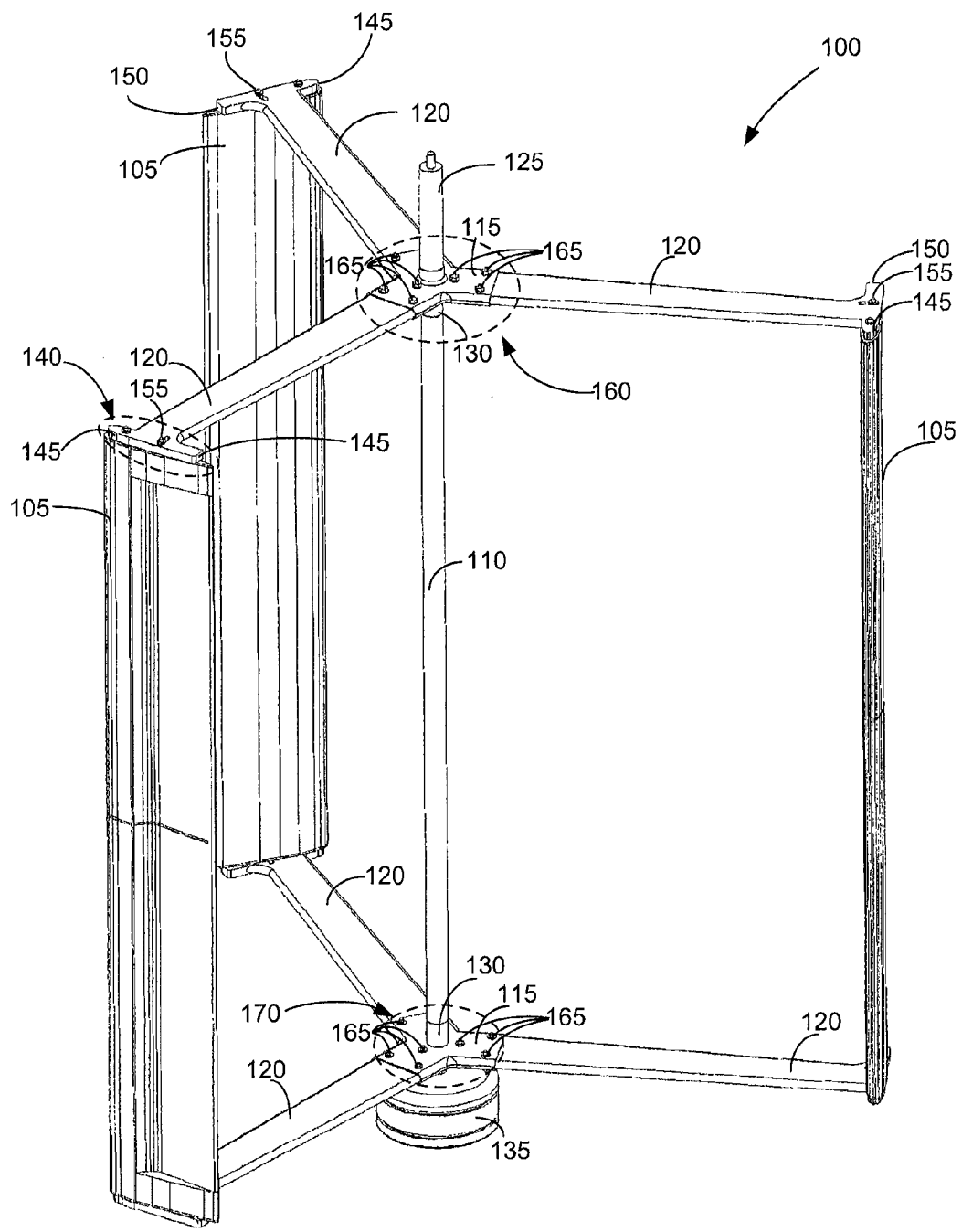
FIG. 1 is a perspective view of a vertical axis wind turbine according to one embodiment of the present invention.
Figure 8:
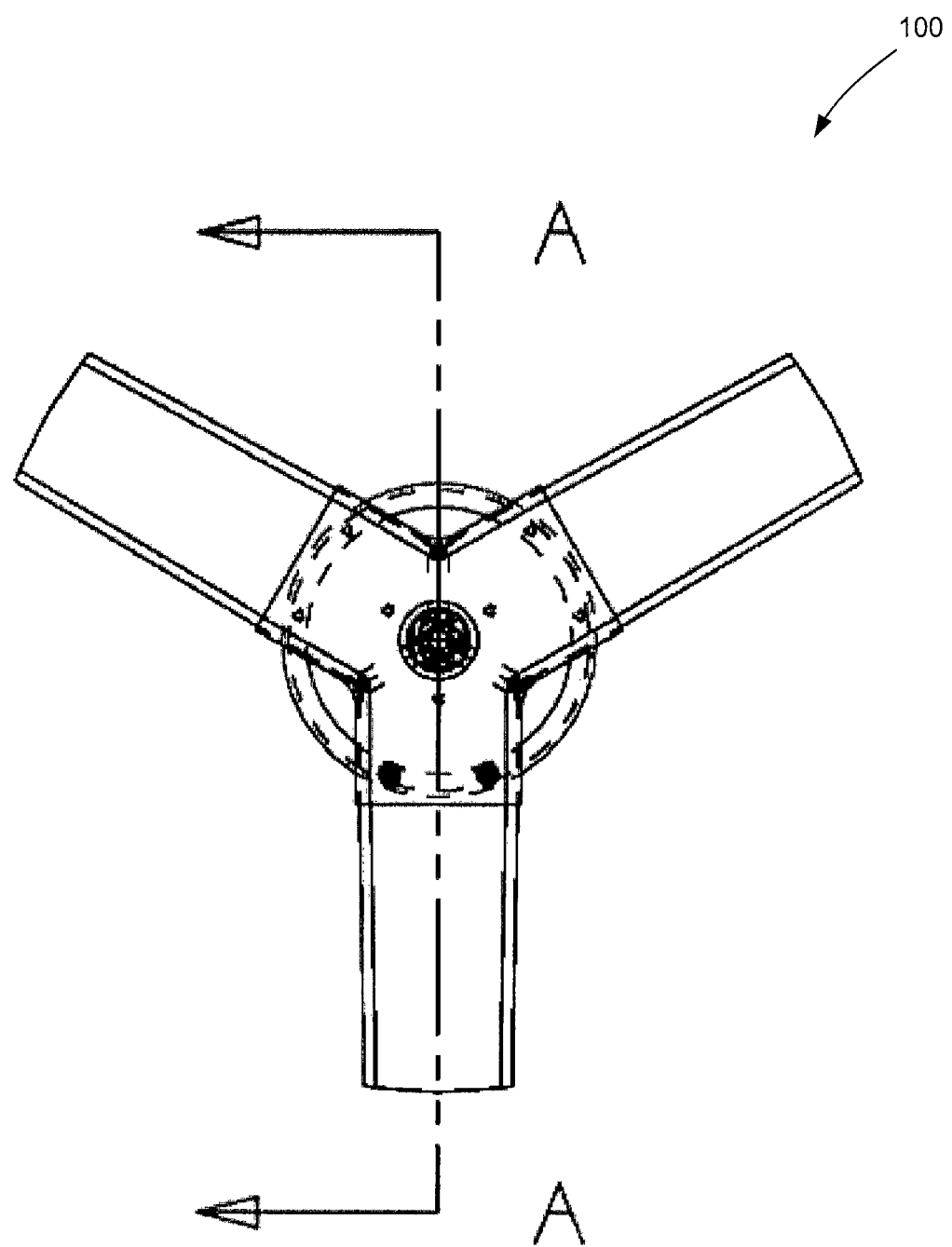
FIG. 8 is a top down view of the vertical axis wind turbine of FIG. 1.

In one embodiment, as shown in perspective in FIG. 1, a VAWT 100 comprises three airfoil-shaped blades 105 attached to a rotary body 110 by rotor hubs 115 and rotor arms 120. When air from the wind catches the blades 105 of the VAWT 100, the movement of the blades 105 can cause the rotary body 110 to rotate about a rotary axis. The rotary body 110 may include, but is not limited to, an elongated shaft and the rotary axis may extend through the centre of that elongated shaft. A shaft assembly component having a tapered end 125 and a shaft assembly insert 130 affix one rotor hub 115 to the upper extremity of the rotary body 110. The rotor hub 115 proximate the lower extremity of the rotary body 110 is secured using a tapered shaft component (labeled 910 in FIGS. 8-10) protruding vertically from a generator unit 135 and a shaft assembly insert 130. The VAVVT 100 can be used to convert kinetic energy from the wind into mechanical energy. By coupling the rotary body 110 to the generator unit 135, the mechanical energy can be used to generate electricity.

Modified Blade Design

Variants of the blade used in an embodiment of the present invention are designed to have an airfoil-shaped body with a leading edge and a trailing edge. An airfoil-shaped body can generally be defined as any body that, when moved through a fluid, produces a force perpendicular to the motion of the body. Some blade variants used in an embodiment of the present invention can be further defined as comprising a symmetrical airfoil modified such that the turbine, of which the blades form a part, can more easily actuate from a fixed position. In particular, the outer camber line 210 of each blade 105 has been modified from the symmetrical by providing a cut-away portion (a cross-sectional view of which is referred to generally as 201 in FIGS. 2 and 3) in what would otherwise be a symmetrical airfoil-shaped blade.

As a result of the modification of the outer camber, a blade is produced with a substantially symmetrical portion and an asymmetrical portion. The asymmetrical portion is the portion of the blade affected by the outer camber modification. The asymmetrical portion can account for most of the length of the blade; however, it can be desirable to incorporate a substantially symmetrical portion of a suitable length to achieve favorable aerodynamic characteristics at the leading edge of the blade when the turbine is rotating. In one embodiment, the substantially symmetrical portion accounts for at least ten percent of the length of the blade. The blade 105 is described below in greater detail.

Figure 2:
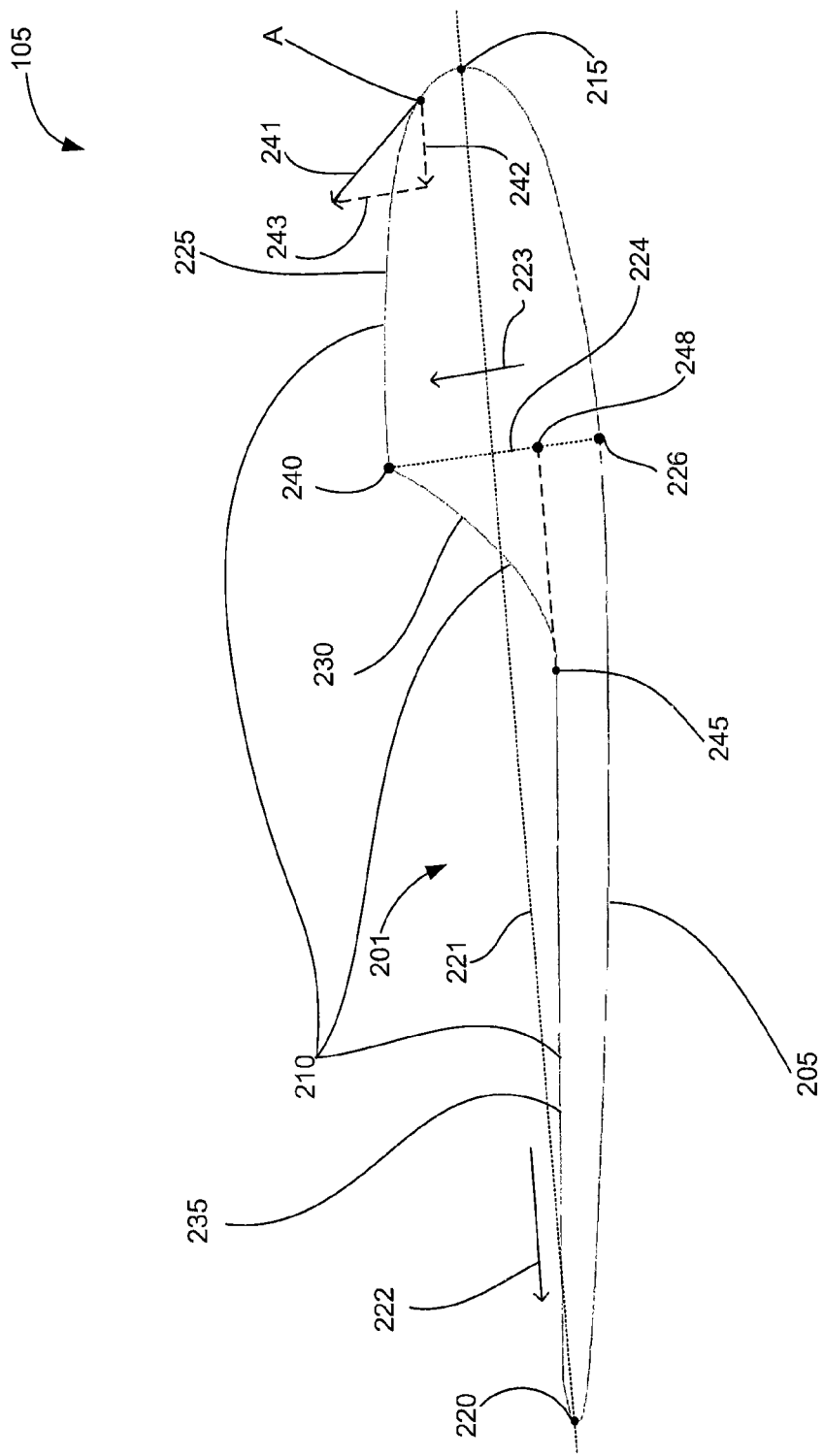
FIG. 2 is a sectional view of a blade in accordance with a first variant of the embodiment of FIG. 1, showing the contour of the blade.

FIG. 2 shows a cross-sectional view of a first variant of blade 105 in accordance with an embodiment of the present invention. The cross-section of each blade 105 is defined by an inner camber line 205; an outer camber line 210; a first convergence 215 of the inner and outer camber lines corresponding to the intersection of the leading edge of the blade with the cross-section of the blade as represented in FIG. 2; and, a second convergence 220 of the inner and outer camber lines corresponding to the intersection of the trailing edge of the blade with the blade's cross-section. The first convergence 215 may also be expressed as a first endpoint located at a first longitudinal extremity of the cross-section of the blade. Similarly, the second convergence 220 may also be expressed as a second endpoint located at a second extremity of the cross-section of the blade.

A chord line 221, which is a straight line extending directly from the first convergence 215 to the second convergence 220, is shown as a dotted line in FIG. 2. The length of the chord line 221 is the overall length of a cross-section of blade 105. Movement along the chord line 221 from the first convergence 215 to the second convergence 220 defines a positive lengthwise direction 222. Conversely, movement along the chord line 221 from the second convergence 220 to the first convergence 215 defines a negative lengthwise direction. A widthwise direction 223 is defined orthogonal to the lengthwise direction 222. A widthwise axis 224 corresponds to the widthwise path between the inner intermediate point 226 on the inner camber line 205 and the outer intermediate point 240 on the outer camber line 210. The inner intermediate point 226 and the outer intermediate point 240 are discussed in further detail below. Movement in the widthwise direction 223 from the inner camber line 205 toward the outer camber line 210 is considered to be positive in sign. Conversely, movement in the widthwise direction 223 from the outer camber line 210 toward the inner camber line 205 is considered to be negative in sign.

An outer camber path direction is defined by a movement along the outer camber line 210 from the first convergence 215 to the second convergence 220. The outer camber path direction at any given point along the outer camber line 210 corresponds to the direction of a line tangent to the outer camber line 210 at that point. Similarly, an inner camber path direction is defined by a movement along the inner camber line 205 from the first convergence 215 to the second convergence 220; and the inner camber path direction at any given point along the inner camber line 205 corresponds to the direction of a line tangent to the inner camber line 205 at that point. Each tangent line defining one of an outer camber path direction and an inner camber path direction can be broken down into two directional components: a first component extending in the lengthwise direction 222; and a second component extending parallel to the widthwise axis 224. The outer camber path direction 241 for an arbitrary point A along the outer camber line 210, including the first component 242 and the second component 243 thereof, is shown in FIG. 2. The first component 242 of the outer camber path direction 241 at point A is positive (i.e. extends in the positive lengthwise direction). The outer camber line 210 of blade variants used in an embodiment of the present invention is shaped such that the first component of the outer camber path direction is positive for any point along the outer camber line 210.

As shown in FIG. 2, the shape of the outer camber line 210 differs from that of the inner camber line 205. The outer camber line 210 is described in more detail with continuing reference to FIG. 2. The outer camber line 210 is divided into a first portion 225; a transition portion 230; and a second portion 235. The first portion 225 extends from the convergence of the inner and outer camber lines at the leading edge 215 of the blade to the outer intermediate point 240; the transition portion 230 extends from the outer intermediate point 240 to the transition point 245; and the second portion 235 extends from the transition point 245 to the convergence of the inner and outer camber lines at the trailing edge 220 of the blade 105.

The first portion 225 of the outer camber line 210 can be a mirror image of the inner camber line 205 with respect to the chord line 221. In other words, the first portion 225 of some blade variants used in accordance with an embodiment of the present invention are symmetrical about the chord line. It will be appreciated by those skilled in the art that blades comprising asymmetrical first portions may also be used in different embodiments of the present invention.

The blade variant of FIG. 2 is an example of a blade 105 wherein the outer intermediate point 240 (i.e. the point along the outer camber line 210 where the transition portion 230 begins) is situated along the outer camber line 210 where the blade is at its maximum thickness. In other words, the thickness of the transition portion 230 of the blade 105 at the outer intermediate point 240 is greater than the thickness of the blade 105 at any other point along the blade 105. It will be appreciated by those skilled in the art that the outer intermediate point 240 need not be situated at the point along the outer camber line 210 where the blade is at its maximum thickness; rather, in some embodiments of the present invention, the outer intermediate point 240 could be positioned closer to the first convergence 215 or, in the alternative, closer to the second convergence 220, along what would be an extension of the first portion 225 of the outer camber line 210.

With continuing reference to FIG. 2, the transition portion 230 is now described. Across this portion, the blade 105 experiences a relatively large reduction in thickness over a relatively short lengthwise distance. According to a blade variant used in one embodiment of the present invention, the thickness of the transition portion 230 at the outer intermediate point 240, which is measured in the widthwise direction 223 from the outer intermediate point 240 to a point along the inner camber line 205 designated the inner intermediate point 226, is more than twice the thickness of the transition portion 230 at the transition point 245, which is measured from the transition point 245 to the inner camber line 205 in the widthwise direction 223. According to another blade variant, the length of the first portion 225 of the outer camber line 210 in the lengthwise direction 222 (i.e. the lengthwise distance between the convergence of the inner and outer camber lines at the leading edge 215 of the blade and the widthwise axis 224) is greater than the length of the transition portion 230 of the outer camber line 210, in the lengthwise direction 222.

The transition portion 230 is relatively short in length in comparison to both the second portion 235 of the outer camber line 210 (or the tail end of the blade), and the overall length of the blade. According to a blade variant used in an embodiment of the present invention, the length of the second portion 235 of the outer camber line 210, in the lengthwise direction 222, can be more than three times the length of the transition portion 230 of the outer camber line 210, in the lengthwise direction 222. According to another variant, the overall length of the blade, in the lengthwise direction 222, is more than four times greater than the length of the transition portion 230 of the outer camber line 210, in the lengthwise direction. According to yet another variant, the length of the second portion 235 of the outer camber line 210, in the lengthwise direction 222, is longer than the combined length of the first portion 225 and the transition portion 230 of the outer camber line 210, in the lengthwise direction 222. In another variant, the combined length of the second 235 and transition 230 portions of the blade—the combination of which corresponds to the cut-away length of the cut-away portion 201—account for more than seventy percent of the overall length of the blade (or the cross-section of the blade).

Some variants of blade can also be described as relatively long as compared to their width. For example, according to some blade variants, the overall length of the blade 105 may be greater than five times the thickness of the transition portion 230 measured at the outer intermediate point 240.

The transition portion 230 is now further described with continuing reference to FIG. 2. The slope of the blade's outer camber line 210 experiences its most drastic change across the transition portion 230, with the greatest instantaneous slope gradient occurring at the outer intermediate point 240. In a blade variant according to an embodiment of the present invention, a magnitude of the average rate of change in transition portion thickness is at least twice the magnitude of the average rate of change in first portion thickness, and the magnitude of the average rate of change in the second portion thickness. As you move along the transition portion 230 from the outer intermediate point 240 to the transition point 245, the slope of the outer camber line 210 levels out and approaches the slope of the inner camber line 205 at a point aligned, in the widthwise direction 223, with the transition point 245 of the outer camber line 210.

Figure 3:
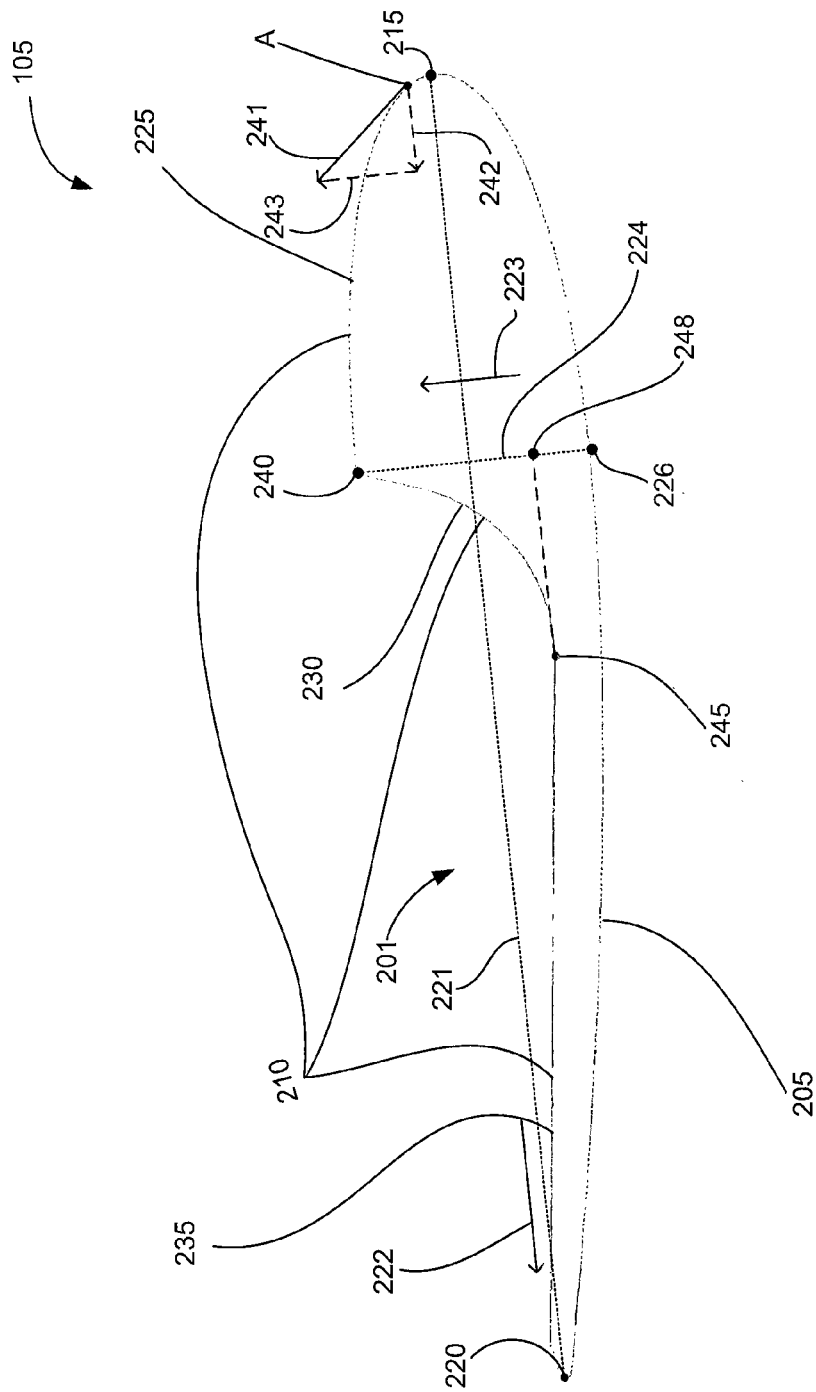
FIG. 3 is a sectional view of a blade in accordance with a second variant of the embodiment of FIG. 1, showing the contour of the blade.

Various embodiments of the present invention may incorporate blades with a straight-lined transition portion (i.e. a transition portion defined by a straight line between the outer intermediate point 240 and the transition point 245) or blades with varying degrees of curvature defining the transition portion 230. Desirable results may be achieved where the transition portion 230 can be represented by an arc. The sectional view of FIG. 3 shows a second variant of blade 105 according an embodiment of the present invention. For clarity, the same reference numerals are used to designate analogous features of the variants of FIGS. 2 and 3. The main difference between the variants of FIGS. 2 and 3 is the degree of curvature of the transition portion 230 the transition portion 230 of the blade variant in FIG. 3 having a greater degree of curvature than that of the blade variant of FIG. 2. In some embodiments of the present invention, the transition portion 230 of the outer camber line 210 can cross the chord line 221. It will be appreciated that in other embodiments, the transition portion 230 of the outer camber line 210 may not cross the chord line 221.

As mentioned previously, the first component 242 (i.e. the lengthwise component) of the outer camber path direction is positive for any point along the outer camber line 210. Consequently, movement along the transition portion 230 from the outer intermediate point 240 to the transition point 245 always produces a positive first component 242. A practical implication of the first (i.e. lengthwise) component 242 of the outer camber path direction being positive along the entire transition portion 230 is that the outer camber line 210 does not incorporate any instance of a "scooped-back" portion. In other words, for each point along the chord line, there is one and only one corresponding point in the widthwise direction along the outer camber line. An advantage of a blade variant 105 having this design is that turbulent air pockets that tend to form in "scooped-back" portions of a blade are avoided. Consequently, non scooped-back blade variants according to an embodiment of the present invention may exhibit superior aerodynamic characteristics.

With continuing reference to FIG. 2, throughout the second portion 235 of the outer camber line 210 (i.e. between the transition point 245 and the convergence of the inner and outer camber lines at the trailing edge 220) the slope of the blade's outer camber line 210 remains relatively constant. Consequently, the thickness of the second portion 235 of the blade also remains relatively constant. As a result of the relatively large thickness gradient across the transition portion 230 of the blade 105, the thickness of the second portion 235 of the blade 105 is small as compared to the thickness of the first portion 225 of the blade 105. One blade variant according to an embodiment of the present invention may comprise an average second portion 235 thickness that is less than half the average first portion 225 thickness.

In connection with the relative thicknesses across the length of blade variants, a cut-away depth corresponds to the widthwise distance between the outer intermediate point 240 and a lengthwise projection of the transition point onto the widthwise axis 248. In a variant of blade according to an embodiment of the present invention, wherein transition portion 230 begins at the maximum thickness of the blade 105, the cut-away depth of the cut-away portion 201 of the blade 105 amounts to between sixty and eighty percent of the maximum thickness of the blade 105.

In another embodiment, the first portion of the blade can make up a substantially symmetrical portion of the blade, and the combination of the transition portion and the second portion can make up an asymmetrical portion of the blade. With reference to FIG. 2, a first displacement between the chord line 221 and the inner camber line 205 is defined as positive as you move in a direction from the chord line towards the rotary body 110. Similarly, a second displacement between the chord line 221 and the outer camber line 210 is defined as positive as you move in a direction from the chord line away from the rotary body 110. Across the asymmetrical portion of the blade, where the outer camber line 210 approaches the chord line 221, the first displacement is greater than the second displacement. In one embodiment, an average of the first displacement over the asymmetrical portion is greater than three times an average of the second displacement over the asymmetrical portion.

Blade Orientation

Figure 4:
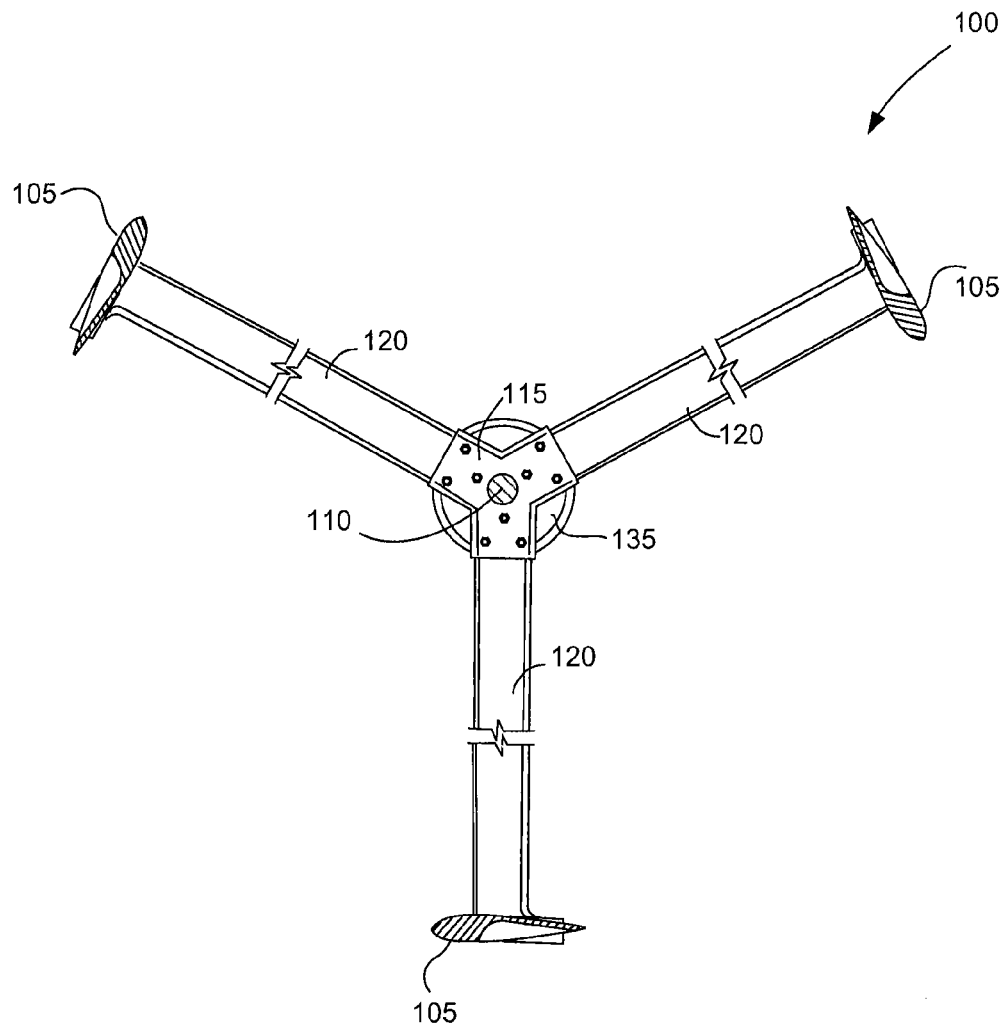
FIG. 4 is a sectional view of the vertical axis wind turbine of FIG. 1 of a section taken parallel to the plane of rotation, orthogonal to the axis of rotation, representing the lower half of the wind turbine.

The physical orientation of the blades is now described with reference to FIG. 4. The blades 105 are installed on a vertical axis wind turbine 100 such that the modified outer camber 210 faces away from the rotary body 110. Consequently, the inner camber 205 faces the rotary body. An advantage of this orientation is that it increases form drag when the blade is oriented away from the direction of the airflow (i.e. when an airflow over the blade 105 contacts the trailing edge of the blade 220 before it contacts the leading edge 215).

The modified blades 105 can allow the turbine 100 to overcome inertia and rotor drag and begin rotation (i.e. startup) at relatively low wind speeds. This has traditionally been a disadvantage of airfoil-based (a.k.a. Darrieus) wind turbines, in which the airflow over a blade due to the blade's motion is added vectorially to the external wind. This resultant airflow generates a net force on the airfoil, which can be projected inward past the turbine axis at a certain distance to give a positive torque to the shaft acting to rotate the turbine in the direction it is already rotating. In a typical airfoil-based wind turbine, when the rotor is stationary the only airflow is due to the external wind, and minimal net rotational force arises; even if the wind speed is relatively high, the rotor must already be spinning to generate significant torque. Thus the design is not normally self-starting. By modifying the outer camber 210 of the blade 105 at the widest point of the airfoil, the resulting blades can produce a relatively high torque output at startup, and yet can also maintain relatively efficient aerodynamic characteristics as the rotational speed of the turbine is increased.

Connection Between the Blade and the Rotor Arm

Figure 5:
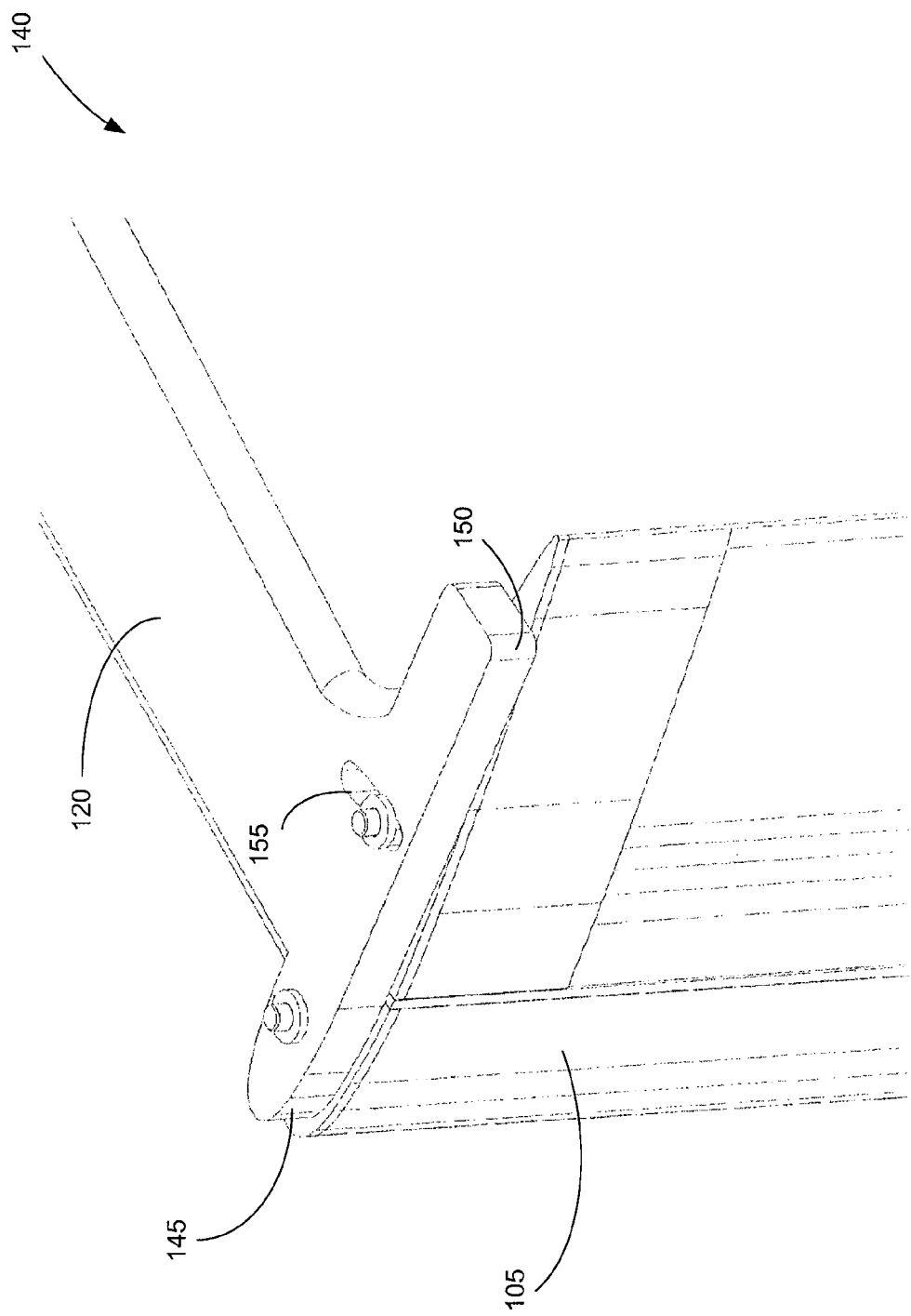
FIG. 5 is an isolated, enlarged view of the intersection of a blade and a rotor arm at a top extremity of the rotary body of the vertical axis wind turbine of FIG. 1.

The couplers used to hold the blades in a fixed position during operation of the vertical axis wind turbine can be rotor arms 120. FIG. 5 shows an enlarged view of the elements within the dashed oval 140 in FIG. 1, and represents a detailed view of the mechanical coupling of a rotor arm 120 and a blade 105 according to an embodiment of the present invention. Each rotor arm 120 has a beveled leading edge 145 and a beveled trailing edge 150, and has a slot 155 at one of the rotor arm's two attachment points. The slot 155 allows for the installation of various sizes of blade over a range of pitch angles. Once the blade is positioned so as to achieve the desired pitch angle, it is fixed into place. In one embodiment, the slot is configured to accommodate a pitch allowance of fifteen degrees for adjustment purposes, whereby the minimum pitch angle with which the blade may be installed is six degrees towards the central shaft. Persons skilled in the art will appreciate that the slot 155 on the rotor arm can be configured to accommodate varying ranges of pitch angles.

Each blade 105 comprises two threaded connection points at both extremities. Each connection point is able to receive a bolt and washer assembly used to couple the rotor arm 120 to the blade 105.

As discussed above, the orientation of the blade when installed is such that the inner camber 205 faces the rotary body 110 and the outer camber 210 faces away from the rotary body 110. In one embodiment, the rotor arms are structured to impede the connection of the blades 105 such that the outer camber 210 faces the rotary body 110 and the inner camber 205 faces away from the rotary body 110.

Connection Between the Rotary Body and the Rotor Arm (Using a Rotor Hub)

Figure 6:
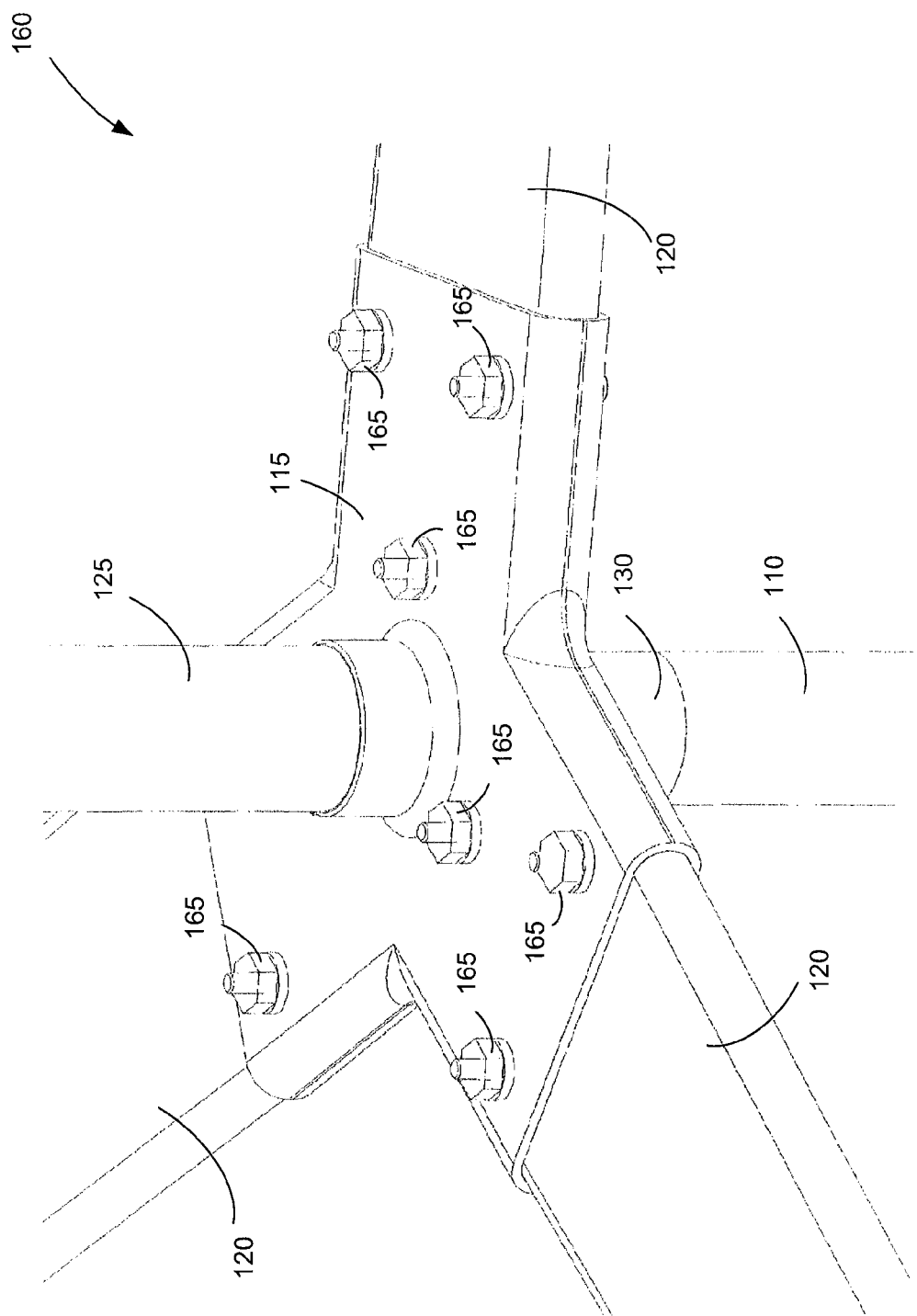
FIG. 6 is an isolated, enlarged view of the intersection of a rotor hub and several rotor arms at an upper extremity of a rotary body of the vertical axis wind turbine of FIG. 1.
Figure 7:
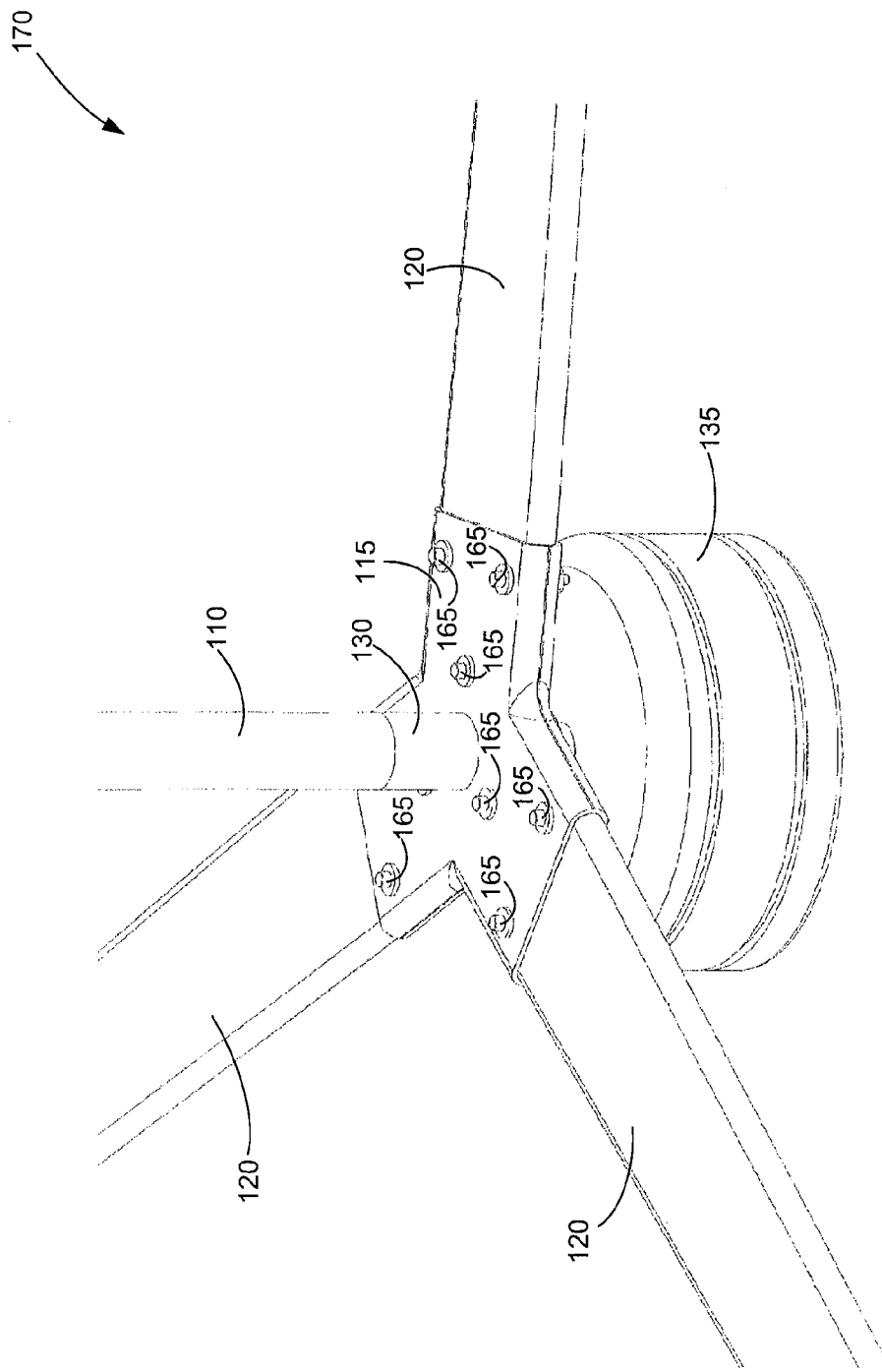
FIG. 7 is an isolated, enlarged view of the intersection of a rotor hub and several rotor arms at a lower extremity of a rotary body of the vertical axis wind turbine of FIG. 1.

FIG. 6 and FIG. 7 show enlarged views of the elements within dashed ovals 160 and 170, respectively, in FIG. 1, and represent detailed views of the rotor hubs 115 used to couple the rotor arms 120 to the upper and lower extremity of the rotary body 110, respectively, according to an embodiment of the present invention.

Figure 9:
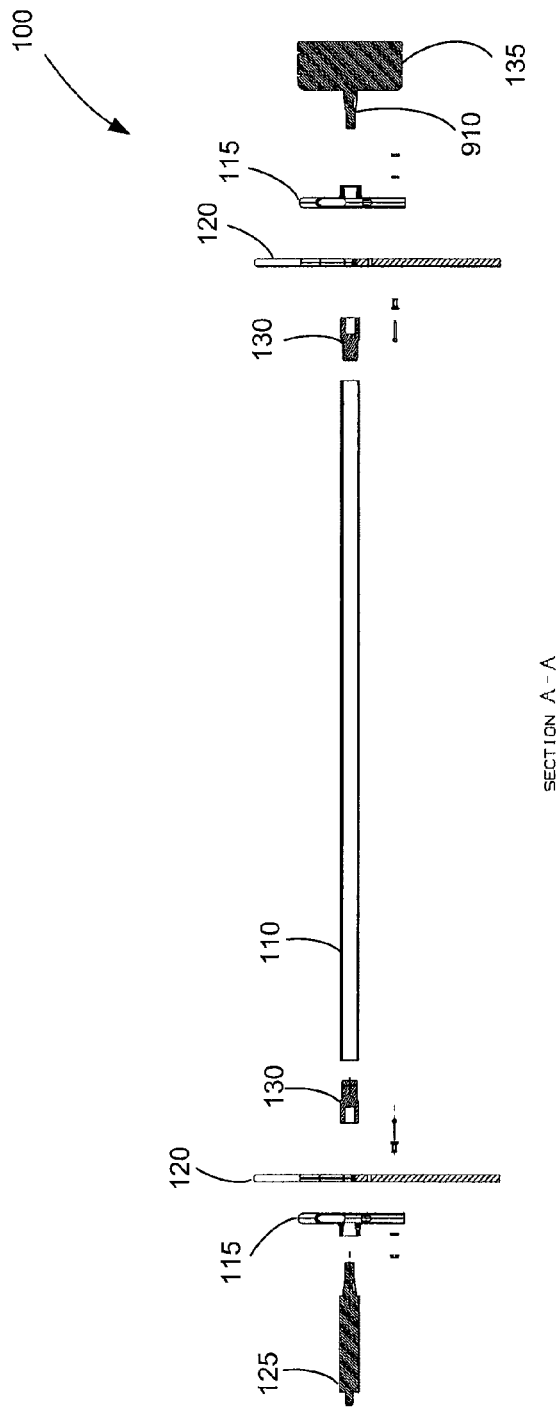
FIG. 9 is an exploded section view along section A-A, of the vertical axis wind turbine of FIG. 8, with the blades omitted.
Figure 10:
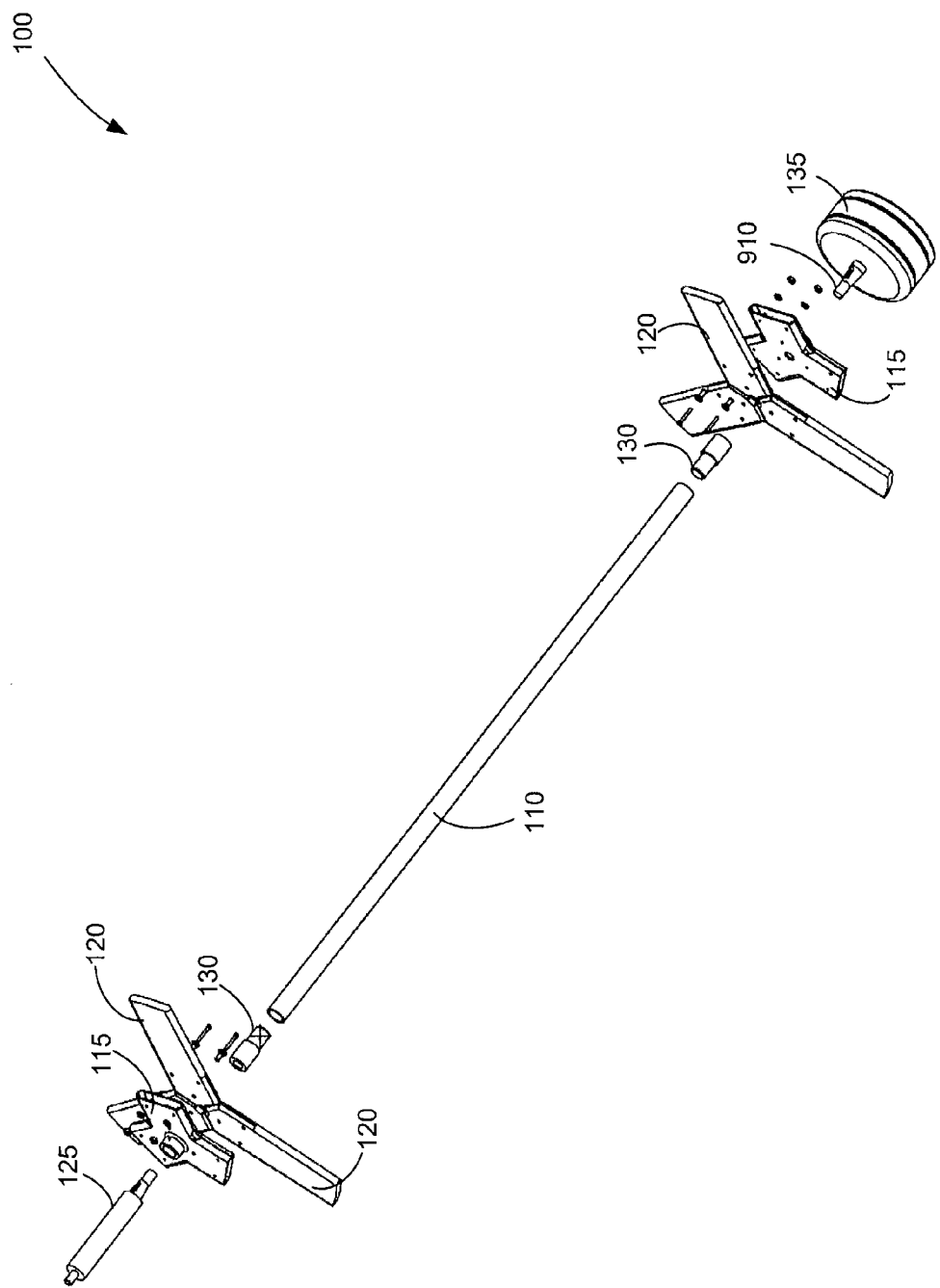
FIG. 10 is an exploded view of a vertical axis wind turbine of FIG. 1, with the blades omitted.

With reference to FIGS. 9 and 10, in one embodiment of the present invention, a rotor hub 115 is used to couple several rotor arms 120 to a rotary body 110. Each rotor hub 115 is adapted to mate with a tapered shaft assembly component. A rotor hub 115 located at an upper extremity of the rotary body 110 mates with a shaft assembly component having a tapered end 125, and a rotor hub 115 located at a lower extremity of the rotary body 110 mates with a shaft assembly component having a tapered end 910 protruding from the generator unit 135.

The rotor hubs 115 and the tapered shaft assembly components 125, 910 can be manufactured to include a means to secure the latter within the former. Examples of such means include the use of a key/keyway combination, the use of a setscrew, and the use of mating male/female threaded portions on each of the components. Persons skilled in the art will appreciate that a means for securing the tapered shaft assembly components 125, 910 within their respective rotor hubs is not limited to the examples listed above.

Both shaft assembly components 125, 910 are adapted for coupling with a shaft assembly insert 130 that is, in turn, adapted to couple to one of the extremities of the rotary body 110. The shaft assembly components 125, 910 and shaft assembly inserts 130 are manufactured to include a means to secure the latter within the former. Examples of such means include, but are not limited to, those listed above for securing the tapered shaft assembly components 125, 910 within the rotor hubs 115. The shaft assembly inserts 130 can be coupled to the rotary body 110 with an adhesive and a series of rivets (not shown in the figures).

Each rotor hub 115 is adapted to receive three rotor arms 120, and comprises a plurality of holes that line up with an equivalent number of holes formed through the entire thickness of the rotor arm. When a rotor arm 120 is received by a rotor hub 115 and the rotor hub's plurality of holes are aligned with the rotor arm's holes, a nut, bolt, and washer assembly 165 may be used in connection with each of the plurality of holes to fasten the rotor hub 115 and rotor arm 120 together.

Materials

As mentioned above, one advantage of various embodiments of the present invention is that the VAWT 100 is lightweight. The materials making up the various components will now be discussed.

In an exemplary embodiment of the present invention, the rotary body 110 comprises a carbon fiber tube. Each rotor hub 115 is constructed entirely of carbon fiber. Each rotor arm 120 comprises a balsa wood core covered with three layers of carbon fiber. Each blade 105 comprises a foam core with both a carbon-reinforced ribbing and a carbon-reinforced spar. The outer skin of the foam core is then covered with two layers of carbon fiber. Each of the carbon fiber tube of the rotary body, the rotor hubs, the rotor arms, and the carbon fiber layers covering the outer skin of the foam core of the blades are impregnated with an epoxy resin.

The use of a light weight material such as carbon fiber for the majority of the components of the vertical axis wind turbine according to various embodiments of the present invention, contributes to lowering the overall weight of the vertical axis wind turbine, therefore decreasing the wind speed necessary to initiate rotation of the turbine. It will be appreciated by persons skilled in the art that desirable results may also be achieved by using alternative lightweight materials of comparable strength to carbon fiber for the various components of the turbine 100 according to various embodiments of the present invention.

It will be appreciated that the components of a vertical axis wind turbine according to embodiments of the present invention may be sold fully assembled or in separate components to be assembled by an end user.

It will be appreciated that, although specific embodiments of the invention have been described herein for purposes of illustration, various modifications may be made without departing from the spirit and scope of the invention. Accordingly, the scope of protection is limited only by the following claims and their equivalents.

The invention claimed is:
1. A vertical axis wind turbine comprising:
a rotary body operable to rotate about a rotary axis; and
a plurality of blades coupled to the rotary body to rotate the rotary body, wherein each blade of the plurality of blades comprises an airfoil-shaped body having a substantially symmetrical portion, and an asymmetrical portion having a outer camber bordering a cut-away portion, and wherein a cross-section through each blade of the plurality of blades transverse to the rotary axis comprises a first endpoint located at a first longitudinal extremity of the cross-section, a second endpoint located at a second longitudinal extremity of the cross-section, a chord line extending from the first longitudinal extremity to the second longitudinal extremity, a widthwise direction substantially perpendicular to the chord line, an inner camber line, an outer camber line, a cut-away length, and a cut-away depth,
wherein
i) throughout the substantially symmetrical portion of the cross-section of each blade, an average magnitude of a widthwise distance between the outer camber line and the chord line is between 90 percent and 110 percent of an average magnitude of a widthwise distance between the inner camber line and the chord line;
ii) a length of the substantially symmetrical portion comprises more than one tenth of the length of the chord line, the length of the substantially symmetrical portion being measured parallel to the chord line;
iii) the outer camber surface of each blade of the plurality of blades faces away from the rotary body;
iv) throughout the asymmetrical portion of the cross-section of each blade, an average of a first displacement from the chord line to the inner camber line is more than three times an average of a second displacement from the chord line to the outer camber line, the first displacement being positive toward the rotary axis, and the second displacement being positive away from the rotary axis;

v) at any point along the chord line, there is one and only one corresponding point along the inner camber line in the widthwise direction, and one and only one corresponding point along the outer camber line in the widthwise direction;

vi) the cut-away length comprises more than seventy percent of the overall length of the cross section; and vii) the cut-away depth comprises more than sixty percent of the maximum thickness of the airfoil-shaped body and less than eighty percent of the maximum thickness of the airfoil-shaped body.

2. The vertical axis wind turbine of claim 1, wherein the cut-away portion of the outer camber line intersects the chord line.

3. The vertical axis wind turbine of claim 1, wherein each blade of the plurality of blades comprises a foam core with a carbon reinforced ribbing and spar, that core being covered with carbon fiber.

4. The vertical axis wind turbine of claim 1, further comprising a generator in mechanical communication with the rotary body.

5. An assembly for converting kinetic energy from the wind into mechanical energy comprising:

a rotary body operable to rotate about a rotary axis; and a plurality of blades couplable to the rotary body to rotate the rotary body, wherein each blade of the plurality of blades comprises an airfoil-shaped body having a substantially symmetrical portion, and an asymmetrical portion having an outer camber bordering a cut-away portion, and wherein a cross-section through each blade of the plurality of blades transverse to the rotary axis comprises a first endpoint located at a first longitudinal extremity of the cross-section, a second endpoint located at a second longitudinal extremity of the cross-section, a chord line extending from the first longitudinal extremity to the second longitudinal extremity, a widthwise direction substantially perpendicular to the chord line, an inner camber line, an outer camber line, a cut-away length, and a cut-away depth, wherein i) throughout the substantially symmetrical portion of the cross-section of each blade, an average magnitude of a widthwise distance between the outer camber line and the chord line is between 90 percent and 110 percent of an average magnitude of a widthwise distance between the inner camber line and the chord line;

ii) a length of the substantially symmetrical portion comprises more than one tenth of the length of the chord line, the length of the substantially symmetrical portion being measured parallel to the chord line;

iii) the outer camber surface of each blade of the plurality of blades faces away from the rotary body;

iv) throughout the asymmetrical portion of the cross-section of each blade, an average of a first displacement from the chord line to the inner camber line is more than three times an average of a second displacement from the chord line to the outer camber line, the first displacement being positive toward the rotary axis, and the second displacement being positive away from the rotary axis;

v) at any point along the chord line, there is one and only one corresponding point along the inner camber line in the widthwise direction, and one and only one corresponding point along the outer camber line in the widthwise direction;

vi) the cut-away length comprises more than seventy percent of the overall length of the cross section; and vii) the cut-away depth comprises more than sixty percent of the maximum thickness of the airfoil-shaped body and less than eighty percent of the maximum thickness of the airfoil-shaped body.

6. The assembly of claim 5, wherein the couplers impede coupling of each blade of the plurality of blades to the rotary body such that the outer camber line faces the rotary body, and the inner camber line faces away from the rotary body.

7. The assembly of claim 5, wherein the cut-away portion of the outer camber line intersects the chord line.

8. The assembly of claim 5, wherein each blade of the plurality of blades comprises a foam core with a carbon reinforced ribbing and spar, that core being covered with carbon fiber.

9. The assembly of claim 5, further comprising a generator adapted for mechanical communication with the rotary body.

* * * * *